(12) United States Patent  
Kelley et al.

(10) Patent No.: US 6,349,820 B1  
(45) Date of Patent: Feb. 26, 2002

(54) BOOK-SHAPED DEVICE FOR HOLDING A CUISINE-SPECIFIC COLLECTION OF HERBS AND SPICES AND BUSINESS METHOD FOR PROVIDING CUISINE-SPECIFIC HERBS AND SPICES

(76) Inventors: Sherrill L. Beard Kelley; Richard D. Kelley, both of 5863 S. Lakeshore Dr., Shreveport, LA (US) 71119

( * ) Notice: Subject to any disclaimer, the term of this patent is extended or adjusted under 35 U.S.C. 154(b) by 0 days.

(21) Appl. No.: 09/467,689

(22) Filed: Dec. 21, 1999

(51) Int. Cl.[7] .............................................. B65D 69/00
(52) U.S. Cl. ..................... 206/223; 206/459.5; 206/472; 434/127
(58) Field of Search ................................. 206/472, 223, 206/459.5, 387.13, 3, 8; 220/507, 553, 555; 426/115, 119; 434/127

(56) References Cited

U.S. PATENT DOCUMENTS

| | | |
|---|---|---|
| 3,641,684 A | 2/1972 | Paige ..................... 206/387.13 |
| 3,851,937 A | 12/1974 | Winston |
| D242,677 S | 12/1976 | Milligan |
| D243,298 S | 2/1977 | Taubman |
| D249,420 S | 9/1978 | Mountain et al. |
| D249,421 S | 9/1978 | Helgesen et al. |
| D249,422 S | 9/1978 | Helgesen et al. |
| 4,125,954 A | 11/1978 | Barbieri |
| D252,429 S | 7/1979 | Morin |
| D253,270 S | 10/1979 | Middleton, Jr. |
| 4,192,439 A | 3/1980 | Segal ..................... 206/387.15 |
| D255,187 S | 6/1980 | Hager |
| D261,455 S | 10/1981 | Ewert |
| D267,762 S | 2/1983 | Chase |
| D267,847 S | 2/1983 | Pielert |
| 4,378,889 A | 4/1983 | Lebowitz |
| D278,585 S | 4/1985 | Oldham |
| D291,637 S | 9/1987 | Burin |
| D291,755 S | 9/1987 | Chap |
| 4,714,305 A | 12/1987 | Service |
| 4,718,550 A | 1/1988 | Johnson .................. 206/387.13 |
| 4,730,831 A | * 3/1988 | De Sio ........................ 273/243 |
| 4,733,863 A | * 3/1988 | Novotny ...................... 434/127 |
| D295,129 S | 4/1988 | Chap |
| D297,082 S | 8/1988 | Binder et al. |
| 4,775,055 A | 10/1988 | Morse |
| 4,779,752 A | 10/1988 | Vallee et al. ................. 220/507 |
| 4,828,498 A | * 5/1989 | Tilney ......................... 434/127 |
| 4,832,208 A | 5/1989 | Finnegan |
| D303,745 S | 10/1989 | Lowe et al. |
| D303,899 S | 10/1989 | Ancona et al. |
| D303,900 S | 10/1989 | Ancona et al. |
| 4,899,725 A | 2/1990 | Barron, Jr. |
| 4,925,027 A | 5/1990 | Roze ........................ 206/387.1 |

(List continued on next page.)

Primary Examiner—Shian Luong  
(74) Attorney, Agent, or Firm—John W. Montgomery; Haynes and Boone, LLP (57) ABSTRACT

A spice-holding device includes a rectangular book-shaped container having a top, bottom, back cover, front cover, a binding end and an opening end defining an interior volume. The interior volume is partitioned into a plurality of compartments for holding predetermined quantities of preselected spices. The front cover is pivotally attached to the book-shaped container along the binding end so that the front cover is pivotable between an open position exposing the spice-holding compartments in the interior volume and a closed position covering the spices for storage and so that the spice-holding device is self-supporting when holding the spices and placed on its bottom. A method of business for distributing selected spices in a cuisine specific book shaped storage device. A method that includes selecting a specific cuisine, collecting spices useful for preparing the selected specific cuisine and making a book-shaped spice-holding device, including a plurality of compartments for holding small quantities of the selected cuisine-specific spices. The book-shaped spice-holding device is labeled with a cuisine indicator corresponding to the selected, specific cuisine for which the collected spices are useful.

1 Claim, 5 Drawing Sheets

U.S. PATENT DOCUMENTS

| | | | |
|---|---|---|---|
| 4,936,462 A | 6/1990 | Yuen | 206/473 |
| 4,976,622 A * | 12/1990 | Clark | 434/127 |
| D316,790 S | 5/1991 | Robbins et al. | |
| 5,024,318 A | 6/1991 | Schwarze et al. | |
| D320,141 S | 9/1991 | Farrell | |
| D323,446 S | 1/1992 | Morse | |
| D323,766 S | 2/1992 | Robbins et al. | |
| 5,096,056 A | 3/1992 | Garcia | 206/472 |
| D325,849 S | 5/1992 | Melcher | |
| D327,820 S | 7/1992 | Ancona et al. | |
| D332,724 S | 1/1993 | Porter | |
| 5,178,416 A * | 1/1993 | Wennik | 283/52.1 |
| D334,510 S | 4/1993 | Ancona et al. | |
| D334,873 S | 4/1993 | Ancona et al. | |
| 5,213,027 A | 5/1993 | Tsotsos et al. | |
| D347,769 S | 6/1994 | Kibbe | |
| 5,338,202 A * | 8/1994 | Saari | 434/127 |
| 5,368,203 A | 11/1994 | Friedrich et al. | |
| D354,875 S | 1/1995 | Scott, Sr. | |
| 5,379,887 A | 1/1995 | Conley, Jr. | 206/232 |
| 5,394,993 A | 3/1995 | Gravell et al. | |
| D372,847 S | 8/1996 | Sparks | |
| D373,708 S | 9/1996 | Hamilton et al. | |
| D380,357 S | 7/1997 | Kibbe | |
| 5,655,673 A | 8/1997 | Weterrings et al. | |
| 5,711,288 A | 1/1998 | Sparks | |
| D397,898 S | 9/1998 | Walters-Dowding et al. | |
| D398,198 S | 9/1998 | Sanders | |
| D398,482 S | 9/1998 | Wang | |
| D401,483 S | 11/1998 | Procelli | |
| 5,839,553 A | 11/1998 | Dorsam | 190/109 |
| D401,817 S | 12/1998 | Doret, Jr. et al. | |
| D401,818 S | 12/1998 | Doret, Jr. | |
| D401,819 S | 12/1998 | Doret, Jr. | |
| 6,015,064 A | 1/2000 | Liu | 206/372 |
| 6,093,430 A | 7/2000 | Gupta | 426/115 |

* cited by examiner

BOOK-SHAPED DEVICE FOR HOLDING A CUISINE-SPECIFIC COLLECTION OF HERBS AND SPICES AND BUSINESS METHOD FOR PROVIDING CUISINE-SPECIFIC HERBS AND SPICES

TECHNICAL FIELD OF THE INVENTION

The present invention relates to a device for holding a collection of small quantities of spices for a specific cuisine and to a method of providing and marketing cuisine-specific spices, and particular to a self-supporting, spice-holding device in the shape of a book and to a method of marketing spices in a cuisine-specific book shaped holding device and more particular to a plurality of book-shaped spice-holding devices, each of the plurality of holding devices containing small, replaceable quantities of spices and ingredients for use in the preparation of recipes identified within a specific type of cuisine and to a method of doing business including marketing one or more or a combination of several cuisine-specific spice holders with cuisine-specific recipes and also to marketing replacement packages of cuisine-specific spices, herbs and ingredients.

BACKGROUND OF THE INVENTION

Prior spice-holding devices have included fixed shelf cupboards for holding self-supporting containers of spices of the users choosing. Previous spice-holding devices have included slidable drawers or compartments in which spices may be filled and/or from which spices may be dispensed. None of the prior devices have provided a book-shaped self-supporting spice-holding device into which small quantities of cuisine-specific spices are provided.

Also, in the past, spices have been sold in separate containers having separate spices, each spice or herb selected by the user according to the user's desires. Also in the past, certain combinations of spices and ingredients have been premixed in single packages for creating a specific recipe as, for example, a powdered soup mix, a chili mix, taco mixes, spaghetti sauce mixes, gravy mixes, sauce mixes and the like. Such premixed spice and ingredient combinations most typically are intended for purposes of a single recipe and a single meal preparation. Those premixed spices do not normally provide for convenient modification of the recipe. Such mixes have not been provided in a self-supporting book. Previously, it was not known to collect individual spices that are associated with a particular group of recipes within a type of food preparation or a cuisine, place them in small quantities into a holding device shaped like a book or in one of a group of "volumes" or a set of various cuisine-specific holding devices and to market the spices together with cuisine-specific recipes and further to market replacement packages of spices to refill depleted, old or stale quantities of the cuisine-specific spices.

SUMMARY OF THE INVENTION

The present invention provides a self-supporting book-shaped spice-holding device. The spice-holding "book" is internally partitioned for holding small quantities of a variety of selected herbs and spices for use in preselected, cuisine-specific recipes. The invention further comprises a collection of spice-holding books, each book uniquely constructed to contain small quantities of a variety of selected cuisine-specific herbs and spices. Each book device for holding spices constructed to support itself when placed on a shelf, in a cupboard or on a countertop. Each spice-holding book is separately labeled for the preselected type of cuisine. The spices, herbs and ingredients held in an individual spice-holding device corresponds to the designated type of cuisine and is called for by any of a number of cuisine-specific recipes provided in a pamphlet also held in the book-shaped spice, herb and ingredient-holding device.

In the preferred embodiment, a collection of individual "books" contain small quantities of a variety of herbs, spices and/or other ingredients that are useful in preparing a particular type of cuisine. The type of cuisine is designated on the outside of the book on the cover and/or on the binding as a particular theme, such as "The American Pantry," "The American Southern Pantry," "The Basic Pantry," "The Cajun Pantry," "The Children's Pantry," "The Chinese Pantry," "The Greek Pantry," "The Indian Pantry," "The Italian Pantry," "The Korean Pantry," "The Mexican Pantry," "The Thai Pantry," "The Vietnamese Pantry," and "Your Pantry" for spices specifically collected according to an individual's own personal recipes. For example, "The Italian Pantry" may have spices such as oregano, basil, garlic, etc. Also for example, "The Mexican Pantry" may have chili powder, red pepper, garlic, and so on.

The Applicant has further created a unique and useful method of doing business including collecting, packaging and providing a variety of selected cuisine-specific spices and herbs in an openable book-like structure for holding small quantities of spices and herbs specifically selected for a designated cuisine. The "books" are labeled to facilitate convenient access to a "library" of a variety of different cuisines. Further, the method of doing business, according to other aspects of this invention, may include the additional step of providing replacement small quantities for refilling the depleted quantities of the separate selected spices. Packages of replacement quantities are sized and shaped for placement in the appropriately labeled, spice-holding device, having individual spiceholding compartments in the book-like structure. A complete set of "volumes" or a complete "library" of cuisine-specific spice-holding devices may also be provided. Further, each cuisine-specific spice-holding device is provided with a holder for a cuisine-specific recipe booklet or a set of recipe cards or sheets. A recipe display structure within the spice-holding device is provided for displaying a recipe booklet, card or sheet exposed to view for reading when the cover of the spice-holding device is open on a countertop in a kitchen or on a shelf in the food preparation area. The user has convenient access to the small quantities of spices for preparation of a readable, displayed recipe, preselected and organized according to the specific cuisine.

BRIEF DESCRIPTION OF THE DRAWINGS

The foregoing objects, advantages, and features, as well as other objects and advantages, will become more apparent with reference to the description, claims and drawings below, in which like numerals represent like elements and in which:

DETAILED DESCRIPTION OF THE PREFERRED EMBODIMENTS

Figure 1:
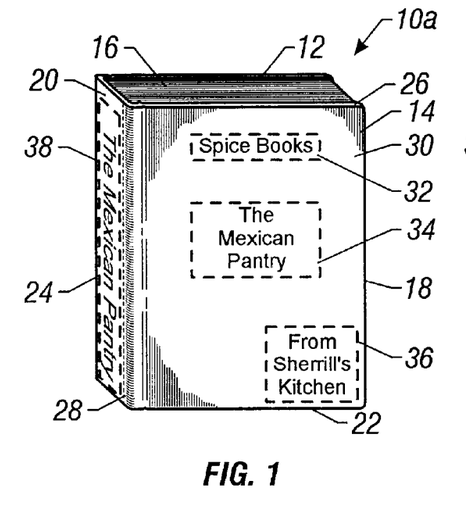
FIG. 1 a perspective view of an exterior of a spice-holding device shaped like a book according to one embodiment of the present invention.
Figure 2:
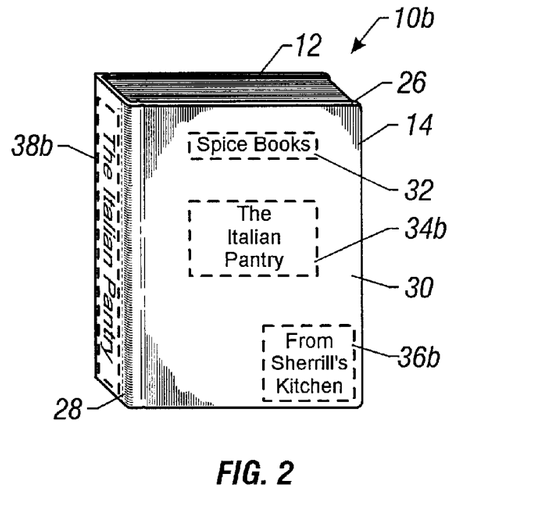
FIG. 2 is another exterior perspective of a spice-holding device according to the present invention in which the designated cuisine is labeled on the exterior of the book-shaped device distinct from the specific cuisine designated by the label on the book in FIG. 1.

FIGS. 1 and 2 show front perspective views of the exterior of spice-holding devices 10a and 10b constructed and having a book-like structure. The construction includes a container 12, preferably a rectangular box shaped container corresponding to the shape of a book with a cover 14. The container is defined by a top 16, end 18, a binding end 20, a bottom 22 and a back 24. Cover 14 is preferably attached along the binding end 20 along a pivot connection 28 so that the cover 14 may be opened and closed at opening 26. The front 30 of cover 24 is preferably provided with at least one print field, including a cuisine descriptor print field 34 at which the specific type of cuisine for which the enclosed collection of herbs and spices, or other ingredients is appropriately indicated with print or an attached label. Cuisine-specific recipes can also be included according to the specific cuisine. Also additional print fields such as a trademark field 32 and a source information print field 36 may be provided, all arranged preferably similar to covers of printed books, thereby mimicking a printed book. There is also a print descriptor field 38 along the binding also for designating a specific cuisine. In the embodiments shown in FIGS. 1 and 2, additional details are shown. FIG. 1 depicts a spice-holding container specifically designated for "The Mexican Pantry," both in descriptor field 34 and also in binding descriptor field 38. A trademark for a particular supplier of the spice-holding container is set forth, as for example, "SpiceBooks™" in trademark field 32.

In FIG. 2, the descriptor "The Italian Pantry," is provided in the descriptor field 34b, thereby indicating that spices, herbs and ingredients specifically useful for cooking Italian cuisine are enclosed within the spice-holding device 10b. Similarly, "The Italian Pantry" is also indicated as the printed cuisine descriptor in binding descriptor field 38b. In each case, the additional information in fields 36 and 36b, FIG. 1 and FIG. 2, set forth an indicator of "authorship," for example, "From Sherrill's Kitchen" that can be useful for purposes of trademark and/or trade dress source of origin indicator for the unique spice-holding device. The "authorship" print field 36 further facilitates mimicking a "book" with a spice-holding device 10.

Figure 3:
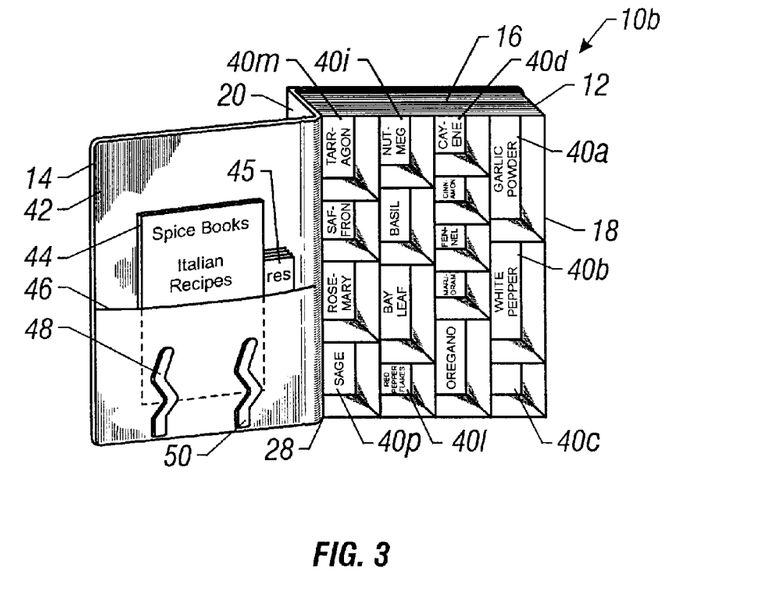
FIG. 3 is a perspective view of a open spice-holding device according to the embodiment of FIG. 1 in which a partitioned interior structure of the book-shaped spice-holding device may be more fully understood.

FIG. 3 depicts a schematic perspective view of the spice-holding device 10b of FIG. 2 showing container 12 divided into a plurality of compartments 40. In this particular embodiment there are sixteen separate compartments 40a–p for holding sixteen separate herbs, spices or ingredients specifically designed for Italian recipes. The total number of compartments 40 and spices held therein may be varied without departing from the invention as claimed. Also, the opened cover 14 has a removably secured recipe book and in this case, an Italian recipe book corresponding to "The Italian Pantry" as designed on the front of the cover at field 34b as well as on the binding of the spice-holding device at field 38b. The recipe book 44 may be secured with a holding device 46, such as a strap, an elastic band, or an envelope into which the recipe book 44 may be removably secured. As an alternative to a recipe booklet 44 recipe sheets or cards 45, selected and collected to match the specifically indicated cuisine may be provided in the cuisine-specific spice holder. Also depicted are resilient supports or clips 48 and 50 secured to inside cover 42 for holding the recipe book 44, or alternatively, for holding recipe cards 45, in a opened, displayed position so that a user may view the recipe at the same time that the compartments 40a–p, and the cuisine-specific spices held therein, may be accessed.

By way of example for FIGS. 2 and 3, in which the spice-holding device 10b is designated as "The Italian Pantry," the recipe booklet 44 may include Italian recipes and the spice-holding compartments 40a–p are filled with individual containers holding quantities of spices selected to be specifically useful for cooking Italian cuisine. In particular, the spices are selected to be useful for the Italian recipes set forth in booklet 44 (or, alternatively in recipe cards or sheets 45) provided with the spice-holding device 10b. For example, the following spices may be selected and then collected and packaged as being Italian cuisine-specific for filling compartments 40a–p of spice-holding device 10b as follows: basil, bay leaf, cayenne, cinnamon, fennel, garlic powder, marjoram, nutmeg, oregano, red pepper flakes, rosemary, saffron, sage, tarragon, thyme and white pepper.

As will be explained more fully below, the spices, herbs or ingredients are selected primarily according to the specific cuisine. Also, preferably, the quantities and package sizes are selected according to the expected quantities to be used. A plurality of compartment sizes are provided in the cuisine-specific spice-holding device so that different package sizes of commonly used herbs and spices for that cuisine are easily held in approximately sized compartments. Thus, the invention provides packaged quantities commensurate with the quantities likely to be used for recipes among that cuisine. Thus, for example, in "The Italian Pantry" spice-holding device 10b, the quantity of garlic powder and oregano advantageously will be large compared to the quantities of nutmeg or thyme.

Figure 4:
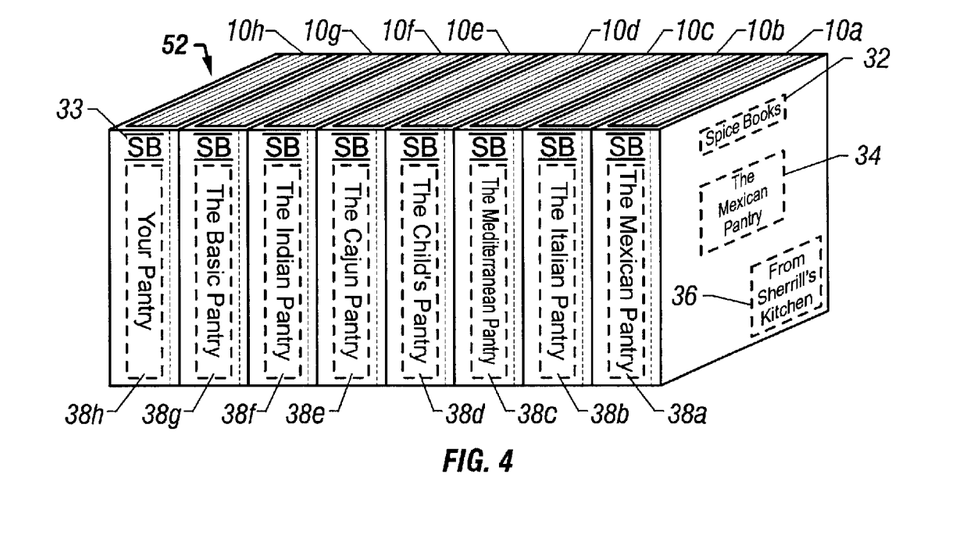
FIG. 4 is a schematic depiction of a collection or set of a variety or a plurality of "volumes" of specifically selected, different, cuisine-specific spice-holding devices conveniently arranged for storage like books on a shelf, according to one aspect of the present invention.

FIG. 4 is a schematic perspective view of a plurality of spice-holding devices, constructed in the shape of books, to provide a set of "volumes" or a "library" of spice-holding devices 10a–h in which 10a, for example, may be "The Mexican Pantry," as in FIG. 1, 10b would be "The Italian Pantry," as in FIGS. 2, 10c might be "The Mediterranean Pantry," featuring herbs and spices for use in preparing Mediterranean cuisine. Additional spice-holding devices could also be provided in the set. For example, 10d may be "A Child's Pantry," containing ingredients associated with foods children love to eat or recipes suitable for a child to cook or prepare, 10e may be "The Cajun Pantry," with the herbs and spices selected to provide ingredients for cooking Cajun cuisine. Also, 10g might be "The Basic Pantry," for types of herbs and spices that might be selected as being basic or common cuisine, and 10h may be a spice-holding device that is provided to allow the user to select and fill the device with herbs and spices useful in their own personal favorites or family recipes. The specific cuisine might be appropriately designated as "Your Pantry" or "My Pantry" and might even be individually customized as "Bill's Pantry," "Jane's Pantry" or "The Jones' Pantry."

Figure 5:
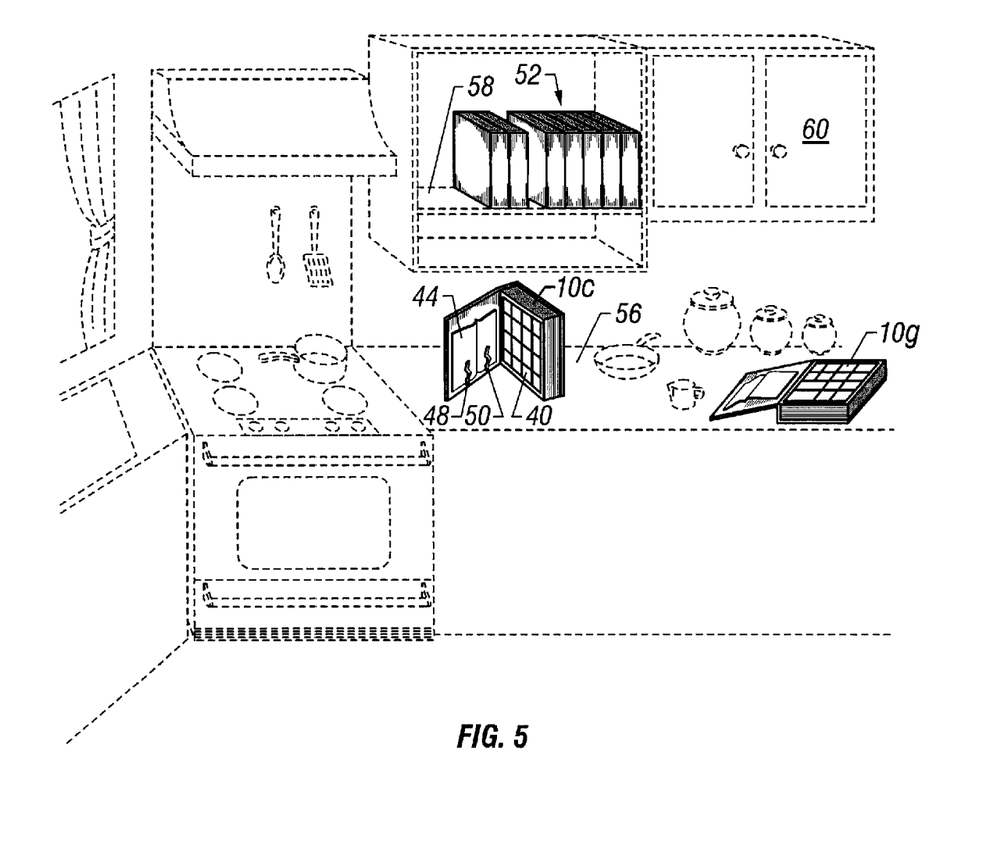
FIG. 5 is a diagrammatic depiction of a device, self-supported in use and others self-supported stored a shelf.

FIG. 5 depicts a spice-holding device 10c opened on a counter in a kitchen (the kitchen shown in phantom lines for demonstration purposes only) with the remainder of the set 52 shown positioned on a shelf 58 conveniently stored as one might store other recipe books. The inventive spice holders provide both the recipes and the spices to prepare them for specific cuisines. It will be understood that the spice-holding devices in the form of a book-like structure might also be stored within a cabinet such as cabinet 60 or otherwise self-supported on the counter 56 or elsewhere, depending upon personal preferences and the arrangement of an individual's kitchen. A convenient and unique aspect of the spice-holding devices is that they are self-supporting, both in storage, as shown on storage shelf 58, and also they are self-supporting on the countertop, or other food preparation surface, for use in a opened position, simultaneously providing access to spice compartments 40 and also displaying a recipe booklet 44 held open by display support clips 48 and 50.

Figure 6:
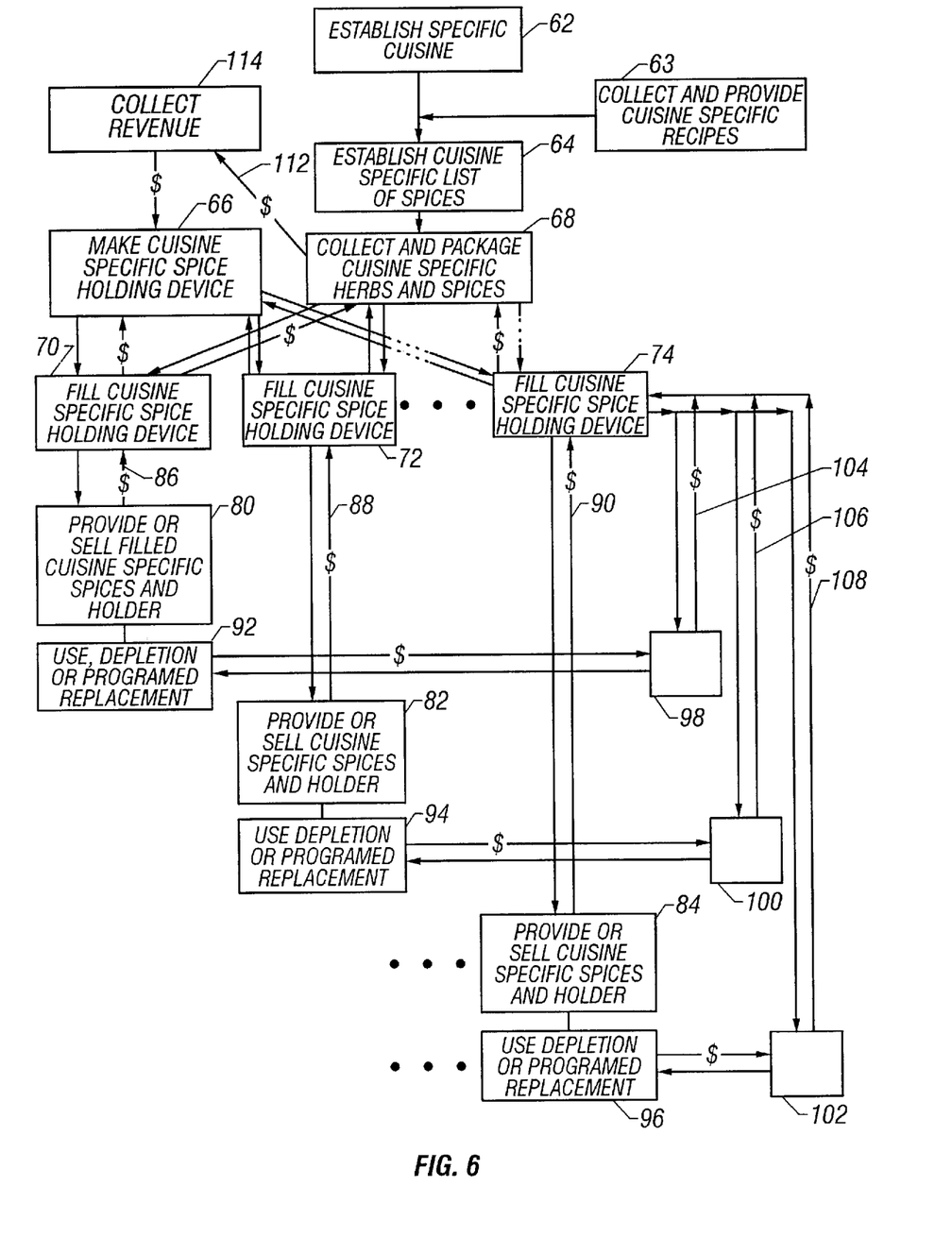
FIG. 6 is a schematic flow diagram of a method of doing business for providing predetermined quantities of selected spices in book-shaped spice-holding devices and presized packages of fresh herbs and spices to replenish depleted quantities or to replace old or stale spices with fresh spices.

FIG. 6 is a schematic flow diagram of a method of doing business for providing predetermined quantities of selected spices in spice-holding, book-shaped devices and for providing pre-sized packages of fresh herbs and spices to replenish depleted quantities or to replace old or stale spices with fresh spices. It is seen that this method of doing business includes the step of establishing cuisine-specific spice lists schematically depicted as step 62 in the process flow chart FIG. 6. Examples of some of the specific cuisines that could be selected may include "The Basic Pantry," "The Cajun Pantry," "The Child's Pantry," "The Indian Pantry," "The Italian Pantry," "The Mexican Pantry" and "The Mediterranean Pantry." Step 62 schematically indicates a step of establishing a list of cuisine-specific spices that is to be performed for each of the selected cuisines to be indicated according to the invention. By way of examples, only step 62, for establishing a cuisine, step 64, for selecting cuisine-specific spices and step 68, for collecting the spices, may be accomplished using the cuisine and cuisine-specific spice lists as follows:

"The Basic Pantry" spice list might be established to include basil, bay leaf, chili powder, cayenne, cumin, curry, garlic salt, nutmeg, oregano, paprika, rosemary, salt, tarragon, thyme, cinnamon and black pepper.

The list of cuisine-specific spices for "The Cajun Pantry" may include basil, bay leaf, cayenne, chili powder, cinnamon, garlic powder, gumbo file, nutmeg, oregano, paprika, red pepper flakes, rosemary, sage, sea salt, thyme and white pepper.

The list for "The Child's Pantry" might, for example, include baking powder, baking soda, basil, black pepper, cake sprinkles, cinnamon, cumin, food coloring, nutmeg, oregano, red pepper flakes and salt.

The list of spices established for "The Indian Pantry" may include, for example, allspice, anise, cardamon, cayenne, cinnamon, ground cloves, coriander, cumin, curry, garam masala, garlic powder, ginger, mustard seed, nutmeg, red pepper flakes and turmeric.

An example of a list of cuisine-specific spices that might be established for "The Italian Pantry" could include basil, bay leaf, cayenne, cinnamon, fennel, garlic powder, marjoram, nutmeg, oregano, red pepper flakes, rosemary, saffron, sage, tarragon, thyme and white pepper.

As example of a list of cuisine-specific spices that might be established for "The Mexican Pantry" could include anise, bay leaf, cayenne, chili powder, ground cloves, coriander, garlic powder, marjoram, mint, nutmeg, oregano, paprika, red pepper flakes, thyme, cinnamon, ancho and black peppercorns.

Establishing the list of cuisine-specific spices for "The Mediterranean Pantry" might include establishing a list including basil, bay leaf, black peppercorns, chervil, cumin, fennel, ginger, marjoram, mint, nutmeg, oregano, paprika, red pepper flakes, rosemary, saffron, sage and thyme.

While the foregoing are given as examples for performing the certain steps of the invention, it will be understood that other spices, according to a particular set of recipes considered to be categorized within one of any number of specified cuisines, might also be included as an additional herb or spice or as alternatives to any one of the foregoing examples of spices for establishing lists. It will further be understood that other types of cuisine, such as German food, Polish food, Chinese food, Japanese food, Thai food, Korean food, Vietnamese food, American Southern cooking, or possibly the specific cuisines might be categorized, not according to ethnicity or region of origin, but rather according to the type of dish, such as "The Dessert Pantry," "The Hors D'oeuvre Pantry," "Main Dishes," "Side Dishes," "Finger Food" or other logical categorizations for which such cuisine-specific herbs, spices and ingredients might be selected, listed, collected and usefully and beneficially provided in a single spice-holding device constructed in a book-like, self-supporting structure. For such other types of cuisine, the establishment of the cuisine in a step 62, establishing cuisine-specific spice lists in step 64, and collecting the cuisine-specific spices in step 68, will be advantageously performed according to the invention.

Step 62 may be further beneficially facilitated by collecting cuisine-specific recipes in a step 63 and referring to such cuisine-specific recipes for establishing the cuisine-specific spice list in step 64. A step 68 indicates the collection of selected herbs and spices corresponding to the cuisine-specific spice list. Step 66 depicts a step for making the spice-holding device. In various embodiments, as depicted, the spice-holding device will have a predetermined number of compartments that might be as few as 5–10 and might be as many as 20–30 or more. Preferably, the number of compartments will be in a range of between 10–20. The book-like spice holder 10 may advantageously be constructed of a size corresponding to what might be considered within a range of sizes for normal hard back books as, for example, a rectangular spice-holding device might be between about 5"–12" wide and between about 7"–14" tall, and between about ¾"–2½" deep to correspond to a "typical" book size and shape. It has been found, for example, that a spice-holding device having a width of between about 7"–8", a height of between about 8"–10" and a depth of between about 1"–2" can be conveniently partitioned to include between about 14–18 compartments, having a variety of sizes. Advantageously, the variety of compartment sizes are designed for holding quantities of spices corresponding to different usages, depending upon the specific cuisine for which the spice-holding device is to be designated. According to a further optional aspect of the invention, each compartment of a cuisine-specific spice-holding device may be constructed and appropriately designated with a print or a label for the particular herb or spice to be held in that compartment.

Another aspect of the method of doing business is the packaging of selected herbs and spices schematically depicted as step 68 in FIG. 6. The herbs and spices are packaged, preferably according to the variety of sizes of compartments, that correspond to the compartment sizes of the spice-holding device 10. The spice-holding devices 10 are filled with the packaged selected herbs and spices, with larger packages placed in larger compartments and with smaller packages placed in smaller compartments, according to expected usage, as determined from the collected recipes or otherwise according to the characteristic usage or strength of flavoring of a particular herb or spice. The spice-holding devices are filled and marked with the appropriate specific cuisine designation in steps 70, 72 or 74, as representative examples of the process. Additional designated specific cuisines will require additional steps (not shown) that are equivalent to steps 70, 72 and 74 of filling container compartments with selected and packaged herbs and spices and appropriately labeling the filled spice-holding devices with the specific cuisine for which the selected herbs and spices have been provided. Another step of the process includes providing, as by selling, each specific cuisine-specific spice-holding device as schematically represented by steps 80, 82 or 84. The step of selling, of course, entails the corresponding receipt of value to the seller, schematically represented as reverse flow "$" at 86, 88 or 90.

An enhancement of the method of providing spices under the unique process according to another aspect of the present invention further includes the concept that an individual user will use herbs and spices. The depleted herbs and spices will need to be replaced. Various herbs and spices may be depleted faster than others. Also, over time, certain herbs and spices might become stale or lose their potency, such that replacement of various selected individual herbs or spices might be appropriate. The time period for replacement might be recommended or "programmed" at specific time intervals according to the type of spice that has been packaged. This natural process of use, depletion, deterioration or programmed replacement gives rise to the inventive process step of selling the prepackaged selected individual quantities of herbs and spices for each of the cuisine-specific spice-holding containers. Thus, the natural consequence of the occurrence of use, depletion, deterioration or programmed replacement, as schematically depicted at 92, 94 or 96, results in the beneficial method of doing business process steps of collecting packaged herbs and spices, as in step 68 and of providing such packaged herbs and spices, for resale at steps 98, 100 or 102, depending upon the cuisine. This results in revenue or reverse flow "$," to the provider of the spices schematically depicted at 104, 106 or 108. Thus revenue is generated not only in the sale of cuisine-specific spiceholding containers, i.e., the manufacturing process at 66 and sales steps of 70, 72 or 74, but also the packaging process 68 further generates revenue 104, 106 or 108 at selling steps 98, 100 or 102, so that the combined revenues from the spice-holding containers schematically represented at 110 and the revenue from packaging and sales of replacement spices schematically represented at 112 are collected by the operator of the business process at step 114. With this inventive method of doing business, the consumer advantageously obtains convenient and freshly replaceable cuisine-specific spices in an easily stored and reusable, cuisine-specific spice-holding device. The provider of the process advantageously obtains initial revenue and ongoing revenue for providing cuisine-specific spice-holding devices, spices and recipes.

Figure 7:
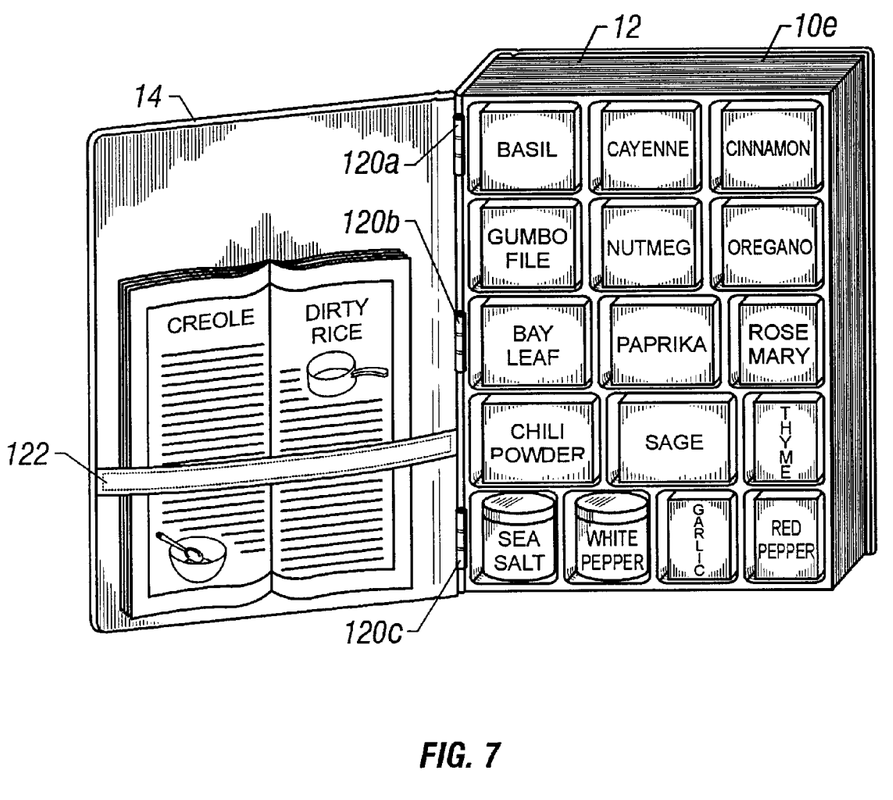
FIG. 7 is an open perspective view of another embodiment of a spice-holding device, according to an alternative design of the present invention in which the book-shaped construction includes a cover hinged to a compartmentalized rectangular box-shaped container.

FIG. 7 is an alternative embodiment of a spice-holding device 10*e* according to the present invention and, in particular, for purposes of demonstration only, a Cajun cuisine spice holder is depicted. The construction includes a cover 14 hinged to the container 12 at hinges 120*a, b* and *c*. The book-like spice holder 10*e* of FIG. 7 may, for example, be comprised of a cardboard or wooden container 12 and a thin, cardboard or wooden cover 14 appropriately connected with hinges 120*a–c* made of plastic, metal or other suitable materials. Alternatively, the structure of container 12 and cover 14 might be plastic or even a lightweight metal with appropriate hinge construction of plastic or metal. In this embodiment, an alternative recipe-holding structure comprising a flexible or elastic strap 122 is also depicted that could serve both to hold the recipe booklet or recipe sheets or cards in place for storage and also to hold the recipe booklet open in a self-supported manner for reading the recipe. The flexible strap 122, might advantageously be either transparent or sufficiently thin so that the recipe booklet might be moved appropriately for reading all the instructions and ingredients.

Figure 8:
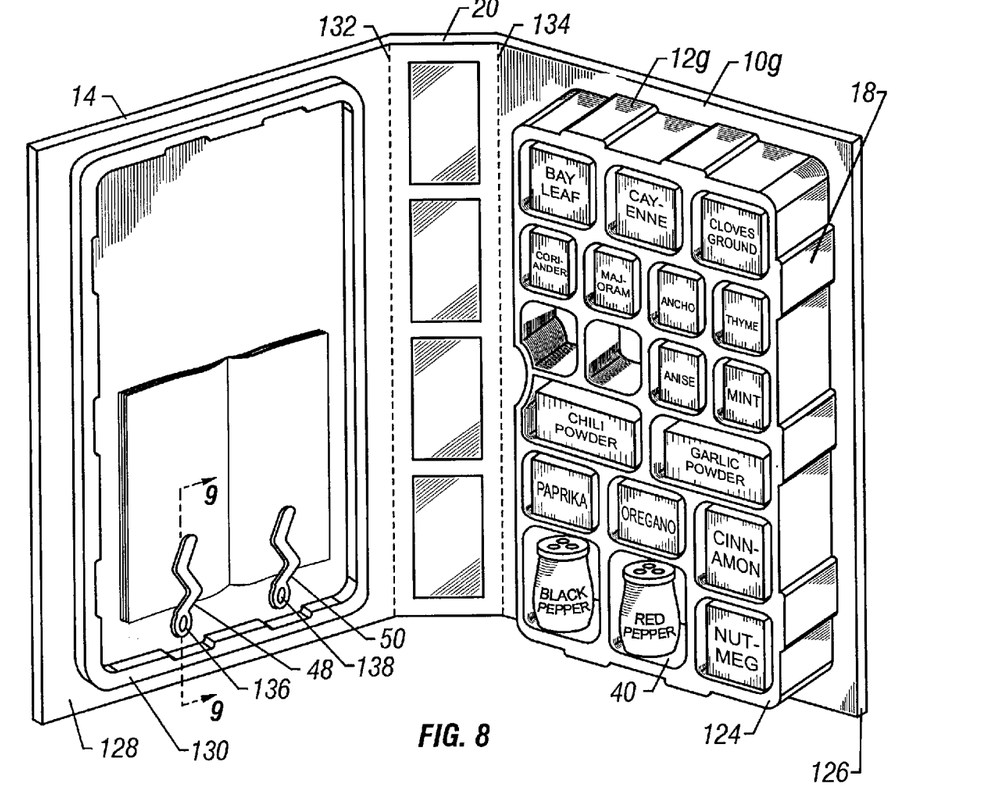
FIG. 8 is a schematic open view of a spice-holding device, according to another embodiment of the present invention, that is convenient to use and economical to produce, in which the book-shaped construction is a vacuum-formed plastic structure and further demonstrating a recipe-holding structure, according to one alternative aspect of the present invention.

In another alternative preferred embodiment, a spice-holding device 10*g* according to FIG. 8 might be a vacuum-formed plastic closable structure in which the partitioned compartments 40 are formed within a container portion 12*g*, as with a hollow, molded projection 124 projecting and integrally formed with a back cover 126. The front cover 14 is constructed of a cover plate 128, preferably having an engagement ridge 130 formed and sized for engaging the exterior of molded projection 124 to hold the structure in a closed position when ridge 130 is moved toward and pressed around projection 124. The binding edge 20 may also be a suitably rigid yet resiliently flexible plastic material forming a hinge 132 or two hinges, as with hinge creases 132 and 134, indented or molded thereinto. Such an integrally formed spice-holding device provides convenient and durable opening and closing of the spice-holding device 10*g*. The technology for forming these types of vacuum-formed closure devices for other uses has been known particularly in connection with video and audio tape cassette holding devices. However, the present invention for holding cuisine-specific spices will uniquely entail certain modifications, including the formation of a plurality of individual compartments and also desirably and advantageously providing a deeper structure than might typically be considered appropriate for holding video tapes and cassettes, which structures typically require depths of only approximating less than ¾". The spice-holding compartments will advantageously be in the range of about ¾"–2½" deep. Also, depicted in FIG. 8 are attached recipe book display support clips 48 and 50.

Figure 9:
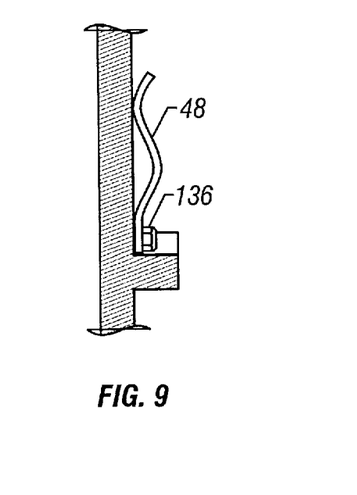
FIG. 9 is a detailed, enlarged partial cross-sectional view of a recipe-holding clip, according to the embodiment depicted in FIG. 8.

FIG. 9 shows a partial cutaway cross-section of the attached clip 48. The clips 48 and 50 might be flexible, metallic items, such as thin, spring steel secured with a fastener 136. The fastener 136 might be a plastic, welded attachment device or a plastic or metal rivet or threaded fastener. Similarly, clips 48 and 50 might be constructed of a resilient plastic material that might be fused or welded directly at points 136 and 138 to the plastic structure of the vacuum-formed embodiment of the spice-holding device 10g. While the details of clips 48 and 50 are shown in FIG. 9 in combination with the vacuum-formed embodiment of spice holder 10g it will be understood that similar recipe display clips also may be appropriately attached to other describe structures for spice-holding devices 10.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method of business for distributing spices comprising the steps of:

a) providing a self-supporting, book-shaped spice holder having a plurality of compartments arranged in an array inside said self-supporting, book-shaped spice holder, said book-shaped spice holder having an openable cover operably engaged with said spice holder, said cover sized and shaped corresponding to the shape of said holder so that said array of compartments can be covered for storage or opened for access to the spice-holding chambers;

b) selecting a plurality of separate quantities of spices according to a predetermined cuisine, each spice usable in one or more recipes for preparation of comestibles corresponding to said preselected cuisine;

c) providing packages having small quantities of said selected spices to be placed in said array of spice-holding chambers;

d) providing cuisine indicative labels by which each book-shaped spice holder can be cuisine-specifically identified;

e) arranging one of said labels to be attached to said self-supporting, book-shaped spice holders identifying said specific cuisine for which said small quantities of selected spices have been inserted into said partitioned compartments; and f) providing a plurality of printed recipes for preparation of said specific cuisine and including said plurality of cuisine-specific recipes attached to said book-shaped spice holder correspondingly labeled to identify said specific cuisine, said recipes, and said cuisine-specific spices.

\* \* \* \* \*

UNITED STATES PATENT AND TRADEMARK OFFICE
CERTIFICATE OF CORRECTION

PATENT NO.    : 6,349,820 B1
DATED         : February 26, 2002
INVENTOR(S)   : Sherrill L. Beard Kelley and Richard D. Kelley It is certified that error appears in the above-identified patent and that said Letters Patent is hereby corrected as shown below:

<u>Title page,</u>
Item [76], Inventors, Sherrill L. Beard Kelley; Richard D. Kelley, both of 5863 S. Lakeshore Dr., Shreveport, LA (US) 71119 should be -- [76] Inventors: Sherrill L. Beard Kelley; Richard D. Kelley, both of 5638 S. Lakeshore Dr. #321, Shreveport, LA (US) 71119 --.

Signed and Sealed this

Fourth Day of June, 2002

*Attest:*

*Attesting Officer*

JAMES E. ROGAN
*Director of the United States Patent and Trademark Office*